(12) United States Patent
Chumbley et al.

(10) Patent No.: US 9,864,810 B2
(45) Date of Patent: Jan. 9, 2018

(54) USER-SPECIFIED USER APPLICATION DATA SHARING

(75) Inventors: Robert B. Chumbley, Round Rock, TX (US); Jacob D. Eisinger, Austin, TX (US); Jennifer L. McNabb, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 866 days.

(21) Appl. No.: 13/594,264

(22) Filed: Aug. 24, 2012

(65) Prior Publication Data

US 2014/0059129 A1 Feb. 27, 2014

(51) Int. Cl.
*G06F 15/16* (2006.01)
*G06F 17/30* (2006.01)

(52) U.S. Cl.
CPC .............................. *G06F 17/30876* (2013.01)

(58) Field of Classification Search
CPC .................................. H04L 51/12; G06F 9/46
See application file for complete search history.

(56) References Cited

U.S. PATENT DOCUMENTS

| | | | |
|---|---|---|---|
| 5,375,200 A * | 12/1994 | Dugan | G06F 3/0481 715/236 |
| 7,437,149 B1 | 10/2008 | Papineau et al. | |
| 7,885,925 B1 * | 2/2011 | Strong | G06F 17/30038 707/620 |
| 2002/0116459 A1 | 8/2002 | Zuberec et al. | |
| 2004/0024834 A1 * | 2/2004 | Alegria et al. | 709/213 |
| 2005/0015355 A1 * | 1/2005 | Heller | G06F 17/30058 |
| 2008/0307007 A1 * | 12/2008 | Alom | G06F 17/30368 |
| 2009/0325630 A1 * | 12/2009 | Tiitola et al. | 455/550.1 |
| 2010/0049874 A1 | 2/2010 | Chene et al. | |
| 2010/0125849 A1 * | 5/2010 | Oswald et al. | 718/103 |
| 2010/0175011 A1 | 7/2010 | Song et al. | |
| 2011/0153712 A1 | 6/2011 | Whetsel | |
| 2012/0144407 A1 * | 6/2012 | Hacigumus | G06F 9/544 719/328 |
| 2013/0097233 A1 * | 4/2013 | Raman et al. | 709/204 |

FOREIGN PATENT DOCUMENTS

WO    WO 2007024532 A2 * 3/2007

OTHER PUBLICATIONS

NPL Stackoverflow Feb. 24, 2012.*

(Continued)

*Primary Examiner* — Viet Vu
(74) *Attorney, Agent, or Firm* — Lee Law, PLLC; Christopher B. Lee

(57) ABSTRACT

An indication initiated by a user within a first local user application that specifies user-selected data sharable by the first local user application is received at an operating system of a first computing device used by the user. A determination is made as to whether any other user applications share data compatibility with at least one portion of the specified user-selected data. In response to determining that at least one other user application shares the data compatibility with the at least one portion of the specified user-selected data, a data share indication to the at least one other user application is configured.

21 Claims, 8 Drawing Sheets

(56) References Cited

OTHER PUBLICATIONS

Author Unknown, Android Developers: Application Fundamentals, Webpage/site, Printed from website on Aug. 7, 2012, pp. 1-8, Android Open Source Project, Published at: http://developer.android.com/guide/topics/fundamentals.html.

Author Unknown, Android Developers: Manifest.permission, Webpage/site, Printed from website on Aug. 7, 2012, pp. 1-28, Android Open Source Project, Published at: http://developer.android.com/reference/android/Manifest.permission.html.

* cited by examiner

USER-SPECIFIED USER APPLICATION DATA SHARING

BACKGROUND

The present invention relates to application integration on user computing devices. More particularly, the present invention relates to user-specified user application data sharing.

Applications executed by devices, such as mobile telephones, generate user interfaces (UIs) that allow users to interact with the applications. The applications may include messaging applications, gaming applications, and other applications of interest to the user.

BRIEF SUMMARY

A method includes receiving, at an operating system of a first computing device used by a user, an indication initiated by the user within a first local user application that specifies user-selected data sharable by the first local user application; determining whether any other user applications share data compatibility with at least one portion of the specified user-selected data; and configuring, in response to determining that at least one other user application shares the data compatibility with the at least one portion of the specified user-selected data, a data share indication to the at least one other user application.

A system includes a memory and a processor programmed to: receive, at an operating system of a first computing device used by a user, an indication initiated by the user within a first local user application that specifies user-selected data sharable by the first local user application; determine whether any other user applications share data compatibility with at least one portion of the specified user-selected data; and configure, within the memory in response to determining that at least one other user application shares the data compatibility with the at least one portion of the specified user-selected data, a data share indication to the at least one other user application.

A computer program product includes a computer readable storage medium having computer readable program code embodied therewith, where the computer readable program code when executed on a computer causes the computer to receive, at an operating system of a first computing device used by a user, an indication initiated by the user within a first local user application that specifies user-selected data sharable by the first local user application; determine whether any other user applications share data compatibility with at least one portion of the specified user-selected data; and configure, in response to determining that at least one other user application shares the data compatibility with the at least one portion of the specified user-selected data, a data share indication to the at least one other user application.

DETAILED DESCRIPTION

Figure 1:
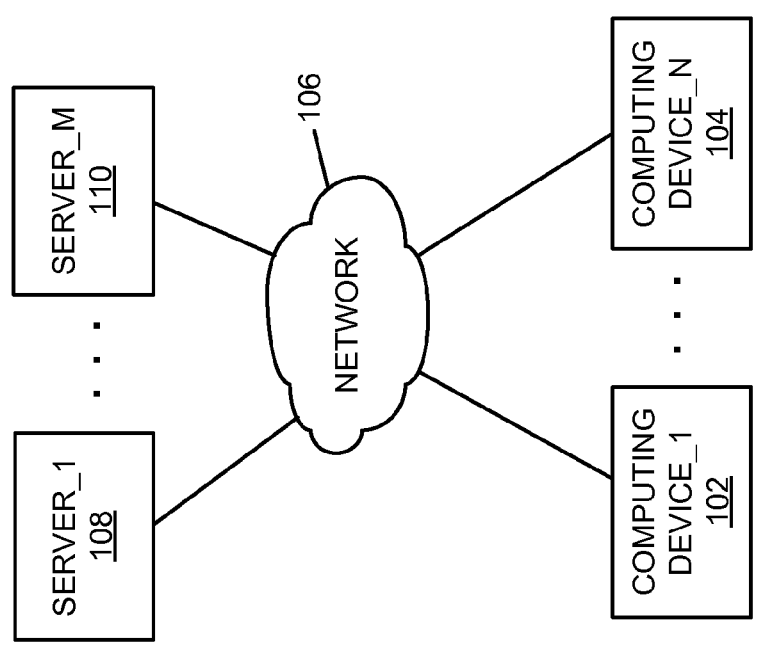
FIG. 1 is a block diagram of an example of an implementation of a system for user-specified user application data sharing according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides user-specified user application data sharing. The present technology facilitates sharing of only certain information, as specified by a user, between user applications. The user applications may be installed on one or more user computing devices. The user may decide and control what data the user wants to share with the user's own applications. A user may specify a subset of information to share and provide permission/authorization to another application to access only the specified information. The permission/authorization may be established for either a single data sharing event/indication or for ongoing (future) data sharing activities for configured sharable data. Further, the sharing of data is implemented on the client side rather than on a server side. As such, the information that is selected by the user for sharing is retained by the computing/client-side device(s) of the user and shared between the user's applications rather than exposing the user's data to server access by other applications or entities. Accordingly, the present technology may prevent data collection websites/servers from collecting excessive information about a user, such as the user's interests or activities.

Where a user has general data (e.g., an address, etc.) that they want to share among applications to avoid re-typing/re-entry of the information, but also has personal data (e.g., financial or medical data) that they do not want to share, the user may share the general information to improve multi-application/multi-device use efficiency and block sharing of the specified personal data. By allowing the user to control data sharing between user applications, the user knows exactly how their information/data will be used. Any user application may be configured to participate in the user-specified user application data sharing described herein.

It should be noted that two-way sharing of data may be specified by the user. As such, two user applications may be configured to share user-specified data. Alternatively or additionally, two or more user applications may be configured to each share different information and to each provide a different service to the user that is enabled by the respective different applications. Many possibilities exist for providing user-specified user application data sharing and all are considered within the scope of the present subject matter.

Additionally or alternatively, applications may be configured to check information sharing status/indication(s) at application startup or at any time during application runtime, to determine whether to provide or retrieve data that has been specified by the user for sharing. The information/data sharing status/indication(s) may be provided, for example, by configuration registers or by the operating system of the client computing device to avoid application programming interface (API) usage, and to provide a more-comprehensive integration of the user-specified user application data sharing among multiple user applications. As such, applications may be configured for user-specified user application data sharing without a need for API integration.

To provide context for the description that follows, the following scenarios illustrate possible implementations of the present technology. For example, a user may specify data sharing between a calendar application and a coupon application. In such an implementation, the calendar application may have details of a vacation or business trip that the user has scheduled during a particular calendar week. The user may allow the calendar application to share information about the planned vacation or business trip to the coupon application. When the user opens or otherwise accesses the coupon application, the coupon application may show the user coupon offers from businesses in the location of the vacation or business trip in addition to coupon offers from businesses in the user's hometown.

As another contextual example, a user may specify data sharing between a music player application and a concert ticket application. The user may use the music player application to listen to the user's favorite bands/singers. The user may allow the music player application to share a list of bands/singers in the user's music library or song playlists with the concert ticket application. When the user opens or otherwise accesses the concert ticket application, the concert ticket application may offer details about upcoming concerts, that are either local to the user or elsewhere, for the user's favorite bands/singers.

As additional context, a user may specify data sharing between a movie theater ticket application and a movie database application. The user may allow the movie theater ticket application to share recently purchased movie theater ticket information with the movie database application. When the user opens or otherwise accesses the movie database application, the movie database application may show new information about other movies that may be of interest to the user (e.g., movies with the same actors, directors, producers, etc.). Further, where two-way sharing of data has been specified or where the user has specified that the movie database application share information about recently-viewed movies with the movie theater ticket application, the movie theater ticket application may offer the user movie ticket offers for other movies that are in the theaters that may be of interest to the user (e.g., movies with the same actors, directors, producers, etc.).

Additionally, a data sharing configuration, as described in more detail below, may be configured and utilized to establish a data sharing authorization for either a single data sharing event or for ongoing data sharing activities, such as for example, in response to changes of data that is configured to be shared between applications. As such, the data sharing configuration may be utilized to establish authorization for future data sharing activities. For example, and returning to the calendar application and coupon application data sharing example described above, a user may configure a data sharing configuration to share calendar information with the coupon application. The coupon application may, in an ongoing manner (e.g., periodically, at scheduled times, or otherwise), determine what trips a user plans using the shared calendar data. If the user adds a trip, the coupon application may be notified (e.g., an interrupt on data change) to obtain calendar and location data for the additional trip to provide coupons for that trip. Accordingly, the present technology allows configuration of future data share events between applications in addition to individual data sharing events. Many other possibilities for granularity of data sharing in quantum and time are possible and all are considered within the scope of the present subject matter.

To further the present contextual examples, where the user has an application open, the user may initiate the sharing of displayed data from that application in a variety of ways. For example, the mechanism to initiate the data sharing process may include detection of a user gesture, such as using a combination of fingers (e.g., two, three, etc.) or holding down a finger to invoke a context menu or a drag operation associated with the displayed data on a touch screen or with a mouse to initiate sharing of data between applications. Alternatively, displayed content drag operations may be detected to initiate data sharing, such as dragging a section of the screen with displayed text to the specified drop area (e.g., at a side or bottom of the display screen). A multiple tap action (e.g., a double tap, a triple tap, etc.) on a touchscreen display may be detected to initiate data sharing, followed by a drag to crop in or crop out part of the displayed data to capture the share targets of interest. A multiple tap may also be utilized to invoke a context menu that provides contextual selections of displayed data content to share and applications or web site accessing applications that are currently open with which data may be shared. As another alternative, a settings/configuration menu for data sharing may be implemented to initiate data sharing. As such, many possibilities exist for initiation of data sharing and all such possibilities are considered within the scope of the present subject matter.

Additional configurations are possible for selecting the application(s) with which to share data. Application-level data sharing filtering may be performed to identify applications that are compatible for data sharing based upon the selected data to share. As such, the application-level data sharing filtering may be used to identify which applications may utilize the data indicated to be shared (e.g., a music playlist, a calendar date, a business name, etc.) Suggestions of applications for sharing may be presented to the user in response to application-level data sharing filtering.

Application pairing popularity may further be utilized and shared among device users. As such, a most popular destination application to pair with a particular source application for data sharing may be defined/configured and shared to further improve user experiences.

To facilitate data filtering, a source application may first query the destination application for data that it is configured to accept. Then, the interface may remove the incompatible data from the source application's interface of data to share.

Additionally, a mechanism for suggesting popular data to share may be implemented. For example, data that may be considered highly portable may be displayed at a top of a list, may be displayed in a bold font, may include a marker (e.g., an asterisk, etc.), or may be otherwise highlighted to the user to expedite data sharing configuration for the user.

It should be noted that while the examples herein may utilize filtering for application and data filtering, data may be shared with incompatible applications without departure from the scope of the present technology. In such an implementation, a warning/notification may be generated. In a future release of a particular destination application, the application may be upgraded to utilize the information/data that is shared.

Additionally, with respect to mechanisms for data selection, several alternatives are possible. For example, the application may have a textual menu by which to apply application settings that allow the user to choose which information/data items to share. The application may allow the user to highlight or drag parts of the user interface to select the desired data to share.

Applications may be configurable to define "data drag sources" or "drag sources." Drag sources for purposes of the present description may be considered highlighted displayed areas of information/data that have been configured by the user for data sharing and that may be dragged to other applications or to a data share area to share the displayed data. Portions of displayed data of any given application may have multiple drag sources that are each configurable by the user via textual menus, multiple touchscreen display taps, or other options as appropriate for a given implementation. The drag sources may be configured within any application by the user to allow the user to share individual portions of information/data.

Drag sources may be of different granularities of data. For example, using the calendar application example described above, drag sources for the calendar application may be defined by the user to include a data field of "all calendars" to allow sharing of all calendar events, may include a field that displays a month (e.g., July 2012) to allow sharing of calendar events for a month, and may include a field that displays one or more days of the month to allow sharing of calendar events for these individual days. The user may configure a drag source for a time period during which the user will be traveling, and may drag the calendar information for the travel time, which may include the location information for the travel, to a coupon application for processing. To configure a contiguous drag source for the travel duration, the user may triple tap each day that is displayed on the user's calendar during the travel period to indicate that the calendar data associated with each of those days is to be shared. Alternatively, the user may triple tap the first and last day during the travel period, with a drag operation between the first and last days after the second triple-tap indication to form the contiguous drag source. Contiguous selections of data elements may be detected by the computing device and merged into a contiguous drag source, and the user may drag the calendar information for the set of days/data fields to the coupon application. Alternatively, drag sources may be configured as non-contiguous "clusters" to allow the non-contiguous drag sources to be dragged to/shared with another application by dragging any one of the highlighted drag sources.

Regarding mechanisms for implementation of the data sharing between applications, the user-specified user application data sharing described herein may be implemented between applications in a variety of manners. For example, data may be securely shared between applications. The data sharing may be implemented at an application layer. Alternatively, the operating system of a computing device may provide a mechanism to "push" or "pull" data from one application to another. As such and as described above, the operating system of the client computing device may be utilized to provide a common interface for data sharing and to avoid application programming interface (API) usage, which may provide a more-comprehensive integration of the user-specified user application data sharing among multiple user applications.

Target/destination applications may be configured to process data sharing configuration information to determine what, if any, data privileges have been granted to the application. The data sharing configuration information may include an indication, such as a flag defined within a data sharing register implemented at the operating system level, that allows the application to learn that it has been granted access/privilege to data. As such, data may then be obtained (e.g., pulled) by the target application from a data sharing configuration area within a memory, such as a drop/mail box area, implemented at the operating system level or from the source application. For the drop/mail box implementation, the drop/mail box area may be configured with a header that defines the data that has been shared (e.g., data types, field widths, etc.). The operating system may push data to target applications when it detects startup of a target application. Alternatively, where the data is to be obtained directly from the source application, if the source application is not already running, but the target application is either running or has been detected to be starting up, the operating system may start the source application to allow the source application to provide the data to the target application. The operating system may shut down the source application in response to completion of the data sharing event. Applications may be configured to query data sharing configuration information at startup and/or at any other periodicity or interval of time as appropriate for a given implementation.

Data sharing may further be implemented as isolated "data instance" sharing, where a single interaction to share data occurs. Alternatively or in addition to data instance sharing, real-time ongoing data sharing may be implemented, to facilitate data sharing data updates between applications. As such, data sharing may be implemented to run as a background task within applications, and notifications to target applications from the operating system level may be utilized to indicate that data sharing has been initiated.

Different operating systems from different device manufacturers may be configured to share data sharing configurations. Conversion operations for data sharing configurations may be performed, if appropriate, either by a source operating system or a target operating system to modify data sharing configurations for use in a target operating system environment. As such, a user may share data sharing configurations between the user's own devices to enable data sharing that has been configured for applications the user utilizes for other of the user's devices. Further, a user may configure data sharing between two of the user's own applications that are installed on different devices. Additionally, users may share data sharing configurations between themselves. As such, many possibilities exist for user-specified user application data sharing and all are considered within the scope of the present subject matter. While the examples herein are directed primarily to inter-application data sharing on a computing device, other possible extensions of the present technology are possible. For example, the present technology may be implemented to share data from a mobile application to a website. Additionally, sharing of data from a website to a mobile application is also considered within the scope of the present technology. As such, many possibilities exist for implementation of the present technology and all are considered within the scope of the present subject matter.

The user may further specify the granularity of the data to be shared or may specify individual data items to be shared. As such, users may specify all of an application's data, a subset of that data, a specific piece of information, or other granularity as appropriate for a given implementation. For example, using the calendar application data sharing example described above, a user may share the user's entire calendar, a particular event, all calendar locations, or any other compartmentalization of data. The shared data may be in the form of complex data types (e.g., data structures stored in a memory for sharing) or in the form of text strings (e.g., with comma separation for multiple values stored within a file, register(s), or other format). Sharing may be performed through detection of a selection of a portion of the screen, by detection of a selection of available data in list form, or otherwise as appropriate for a given implementation.

Application data compatibility may also be configured and managed by the present technology to facilitate data compatibility checking between applications. Filtering of compatible data sharing between two applications may also be implemented to manage data compatibility between applications. For example, a filter may be used to display within a user interface (UI) of the user's computing device the user applications (either local on the same user's computing device or on another one or more of the user's own computing devices) that are compatible for sharing particular data items/sets. This UI view may be presented within a gallery-style set of icons, but may alternatively be displayed within a list view. Returning to the calendar and coupon application example described above, locations of calendar events may be utilized to generate coupons by data sharing. Within such an implementation, if the coupon application may only make use of location information, then other calendar event information may be filtered and not shared between the source calendar application and the destination/target coupon application.

It should be noted that conception of the present subject matter resulted from recognition of certain limitations associated with user applications on mobile or other computing devices. For example, it was recognized that previous technology does not allow users of applications (Apps) on a mobile or fixed platform to granularly select what user data to share between the user's applications (Apps) and does not allow users to specify the applications with which to share a user's application-generated data. Further, it was observed that where an application shares data within a server-side implementation, the user has either no control or limited control over the sharing of the user's application-generated data by these applications, and the user's privacy may be compromised by use of data sharing between applications on a server. The present subject matter improves application integration on a user's computing device by providing for user-specified user application data sharing, as described above and in more detail below. As such, improved use of data by a user may be obtained by use of the present technology.

The user-specified user application data sharing described herein may be performed in real time to allow prompt sharing of information and data as specified for sharing by a user. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for user-specified user application data sharing. A computing device_1 102 through a computing device_N 104 may communicate via a network 106 with each other and/or with other devices. The other devices may include a server_1 108 through a server_M 110 that execute server-side components of applications executed by the computing device_1 102 through the computing device_N 104. For purposes of the present examples, the computing device_1 102 through the computing device_N 104 may include multiple computing devices owned by one application user, and may include other computing devices owned by other application users.

As will be described in more detail below in association with FIG. 2 through FIG. 7B, the computing device_1 102 through the computing device_N 104 may each provide automated user-specified user application data sharing. The automated user-specified user application data sharing is based upon user selection and identification of data/information to share between applications that are used by the user on one or more of the computing device_1 102 through the computing device_N 104. The automated user-specified user application data sharing may further be implemented to share data sharing configurations among different users of certain of the computing device_1 102 through the computing device_N 104. As such, a variety of possibilities exist for implementation of the present subject matter, and all such possibilities are considered within the scope of the present subject matter.

It should be noted that any of the computing device_1 102 through the computing device_N 104 may be portable computing devices, either by a user's ability to move the respective computing devices to different locations, or by the respective computing devices' association with a portable platform, such as a plane, train, automobile, or other moving vehicle. It should also be noted that the respective computing devices may be any computing devices capable of processing information as described above and in more detail below. For example, the respective computing devices may include devices such as a television, a set-top-box (STB), a video playback device, a game console, a personal computer (e.g., desktop, laptop, etc.) or a handheld device (e.g., cellular telephone, smartphone, personal digital assistant (PDA), email device, music recording or playback device, tablet computing device, e-book reading device, etc.), or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through a server_M 110 may include any device capable of providing data for consumption by a device, such as any of the computing device_1 102 through the computing device_N 104, via a network, such as the network 106. As such, the server_1 108 through a server_M 110 may each include a web server, application server, or other data server device, as appropriate for a given implementation.

Figure 2:
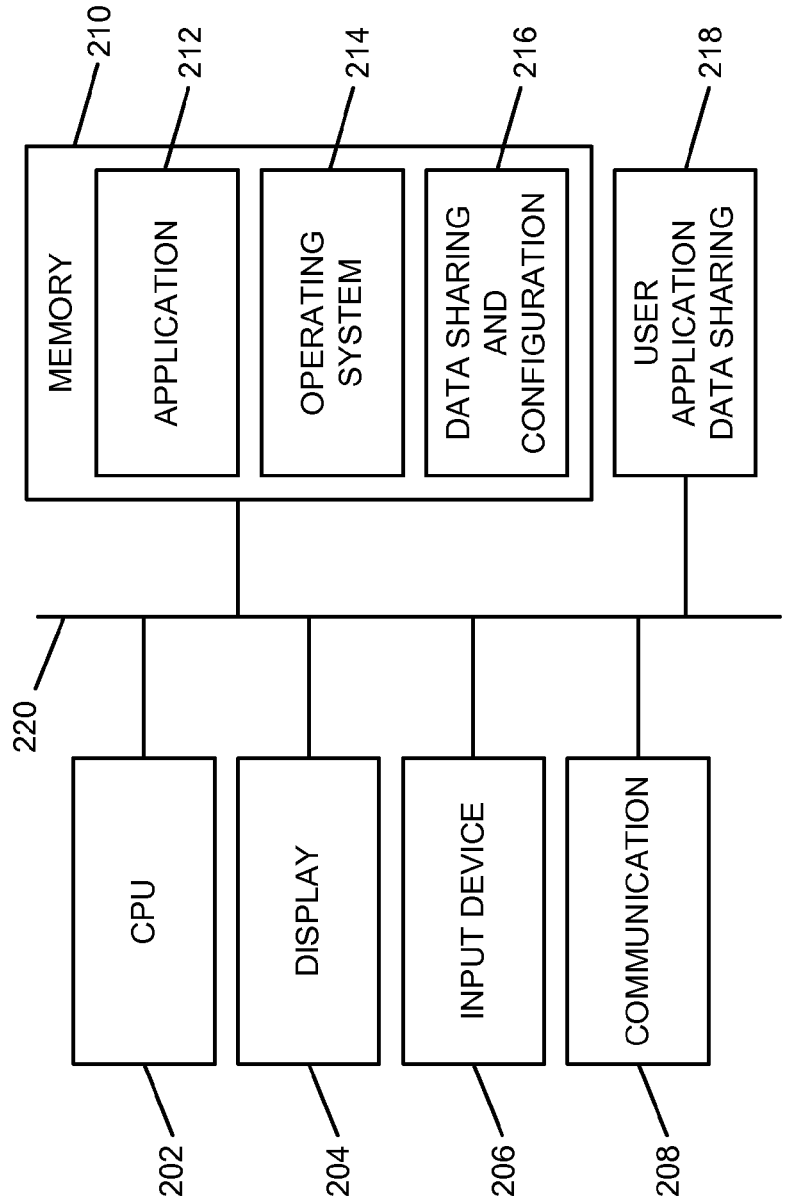
FIG. 2 is a block diagram of an example of an implementation of a core processing module capable of performing user-specified user application data sharing according to an embodiment of the present subject matter.

FIG. 2 is a block diagram of an example of an implementation of a core processing module 200 capable of performing user-specified user application data sharing. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of user-specified user application data sharing in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes an application area 212 that provides storage and execution space for applications in association with the core processing module 200. An operating system area 214 provides storage and execution space for one or more operating systems. A data sharing and configuration storage area 216 stores data sharing configurations, data sharing indications, and data to share among user applications executed by the core processing module 200 (or user applications of other computing devices of the user).

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A user application data sharing module 218 is also illustrated. The user application data sharing module 218 provides processing capabilities for user application data sharing within the core processing module 200, as described above and in more detail below. The user application data sharing module 218 implements the automated user-specified user application data sharing of the core processing module 200.

It should be noted that for purposes of the present examples the user application data sharing module 218 is implemented in association with the computing device_1 102 through the computing device_N 104 for data sharing among user applications (e.g., user applications associated with one or more computing devices owned/used by the user). For implementations where data sharing configurations are to be shared among computing devices, such as the computing device_1 102 through the computing device_N 104, the user application data sharing module 218 may be implemented in association with one or more of the computing device_1 102 through the computing device_N 104 and/or one or more of the server_1 108 through the server_M 110 to facilitate sharing of data sharing configurations between multiple devices.

It should also be noted that the user application data sharing module 218 may form a portion of other circuitry described without departure from the scope of the present subject matter. Further, the user application data sharing module 218 may alternatively be implemented as an application stored within the memory 210. In such an implementation, the user application data sharing module 218 may include instructions executed by the CPU 202 for performing the functionality described herein. The CPU 202 may execute these instructions to provide the processing capabilities described above and in more detail below for the core processing module 200. The user application data sharing module 218 may form a portion of an interrupt service routine (ISR), a portion of one or more of the operating system stored within the operating system area 214, a portion of a browser application, or a portion of a separate application without departure from the scope of the present subject matter.

The CPU 202, the display 204, the input device 206, the communication module 208, the memory 210, and the user application data sharing module 218 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
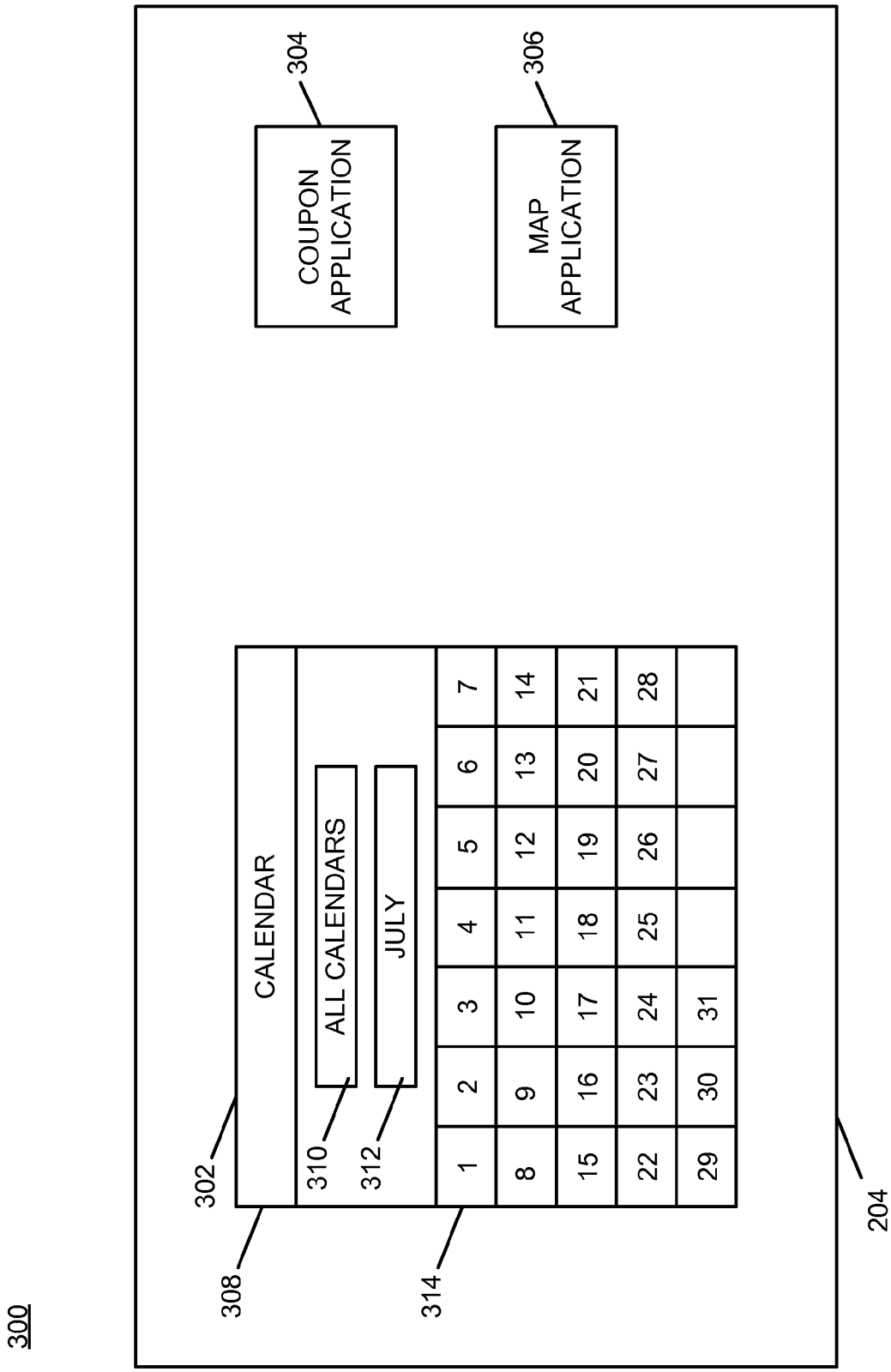
FIG. 3 is an illustration of an example of an implementation of initial processing within a graphical user interface (GUI) for user-specified user application data sharing according to an embodiment of the present subject matter.
Figure 4:
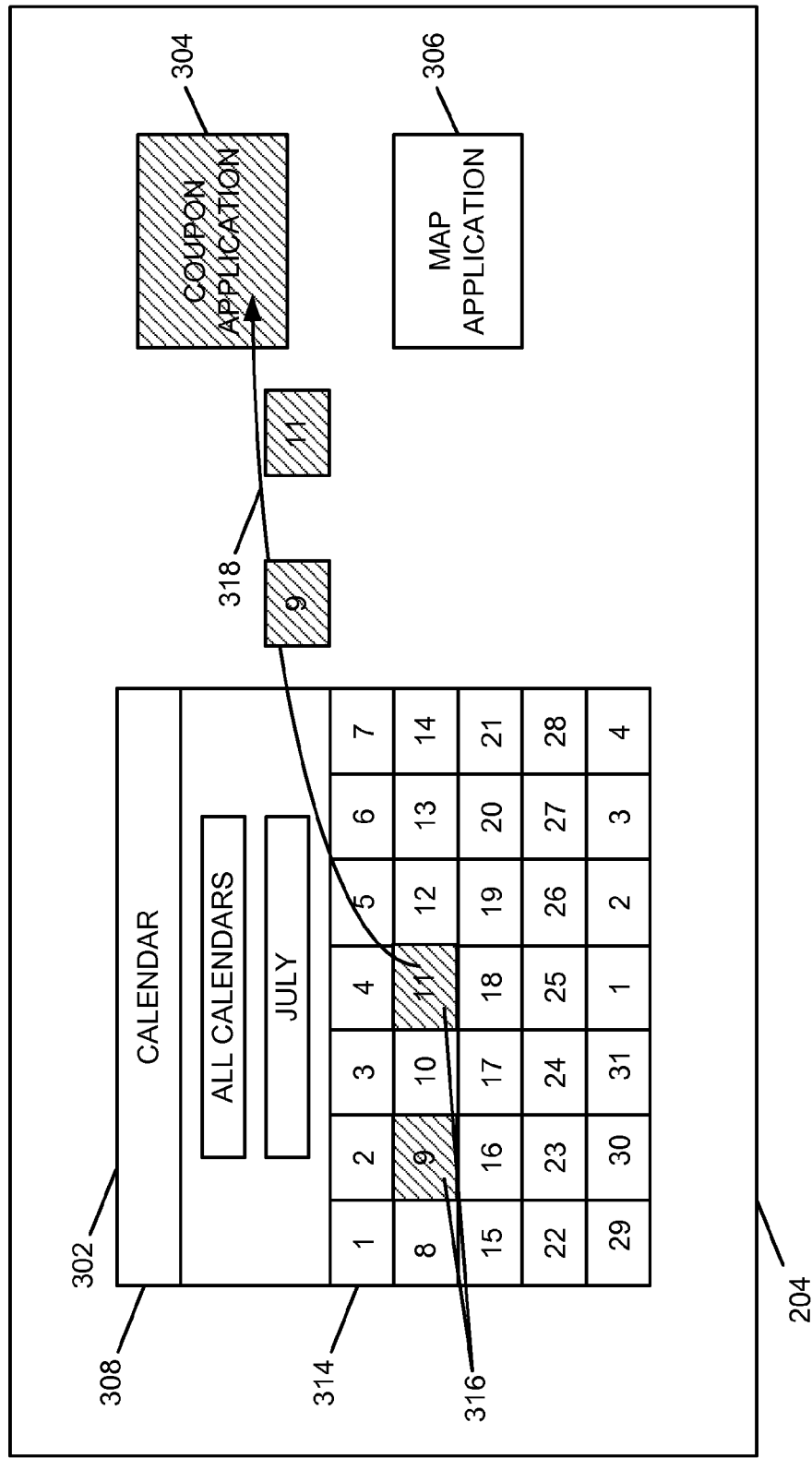
FIG. 4 is an illustration of an example of an implementation of a first stage of additional processing within a graphical user interface (GUI) for user-specified user application data sharing according to an embodiment of the present subject matter.
Figure 5:
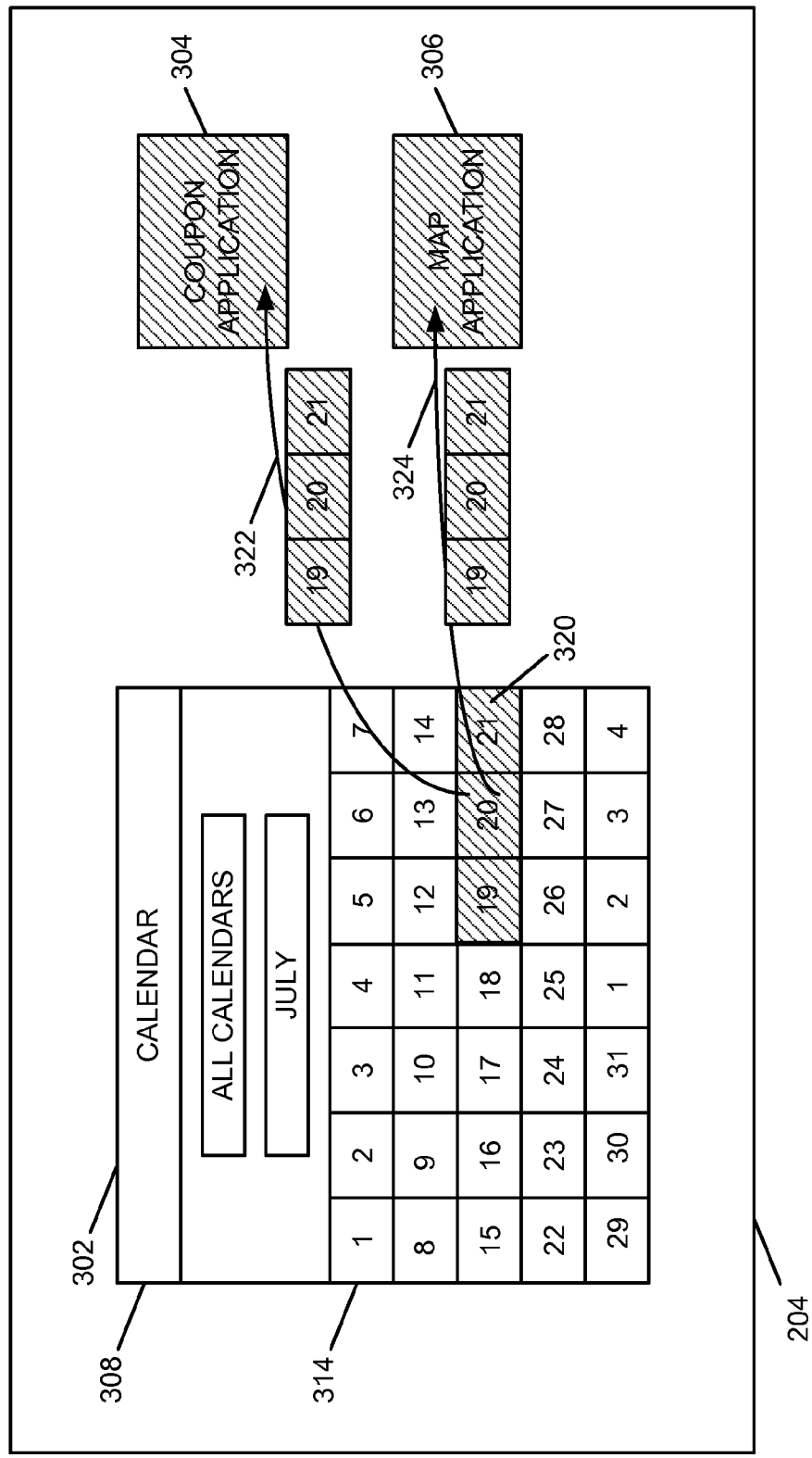
FIG. 5 is an illustration of an example of an implementation of a second stage of additional processing within a graphical user interface (GUI) for user-specified user application data sharing according to an embodiment of the present subject matter.

FIG. 3 through FIG. 5 described below represent an example of an implementation of a graphical user interface (GUI) 300 for user-specified user application data sharing. FIG. 3 illustrates initial processing within the GUI 300. A calendar application 302, a coupon application 304, and a map application 306 are represented within the GUI 300 and are illustrated as being displayed by the display 204. For purposes of the present example, it is assumed that the calendar application 302 is opened and executing, and that the coupon application 304 and the map application 306 are not currently executing, but are represented within the GUI 300 as icons. Additionally, each of the applications 302 through 306 may represent sharable data interfaces within a memory, such as using a data sharing configuration register/structure within the data sharing and configuration storage area 216 of the memory 210, and that the respective sharable data interfaces may be utilized to determined data compatibility of the non-executing applications. Alternatively, where any applications are running, they may be queried directly for their data compatibilities.

The calendar application 302 includes data associated with a user's calendar, such as activities associated with certain dates, locations of those activities, reminders, and other information as appropriate for a given implementation. For purposes of the present example, it is further assumed that the user is interested in obtaining coupons for use at local restaurants during a lunch break from work on each of July 9 and July 11, and that these calendar entries do not include location information because current/default location information may be presumed by other applications absent specific entry of different location information within the calendar data. It is further assumed that the user has a business trip planned to a different town/location between July 19 and July 21, that the user would like to obtain coupons for use in the different town and would like to obtain driving directions to this different town, and that location information has been entered by the user into the calendar application 302 that identifies the different town and its respective location. By using the present technology, as described above and in more detail below, the user may invoke services of the coupon application 304 and the map application 306 by use of data selection and data drag source identification within the calendar application 302.

It should be further noted that, while the present sequence for the GUI 300 provides examples of either compatibility or non-compatibility of data that is to be shared, subsets of data requested/specified by the user for sharing may be identified as appropriate for a given implementation. For example, where a user has a calendar entry that includes date information, destination information for a business trip, and a personal note that is not applicable to or pertinent for functionality of a target application, the personal note may be omitted from data sharing, and a subset of compatible data within the specified user-selected data may be identified.

As can be seen from FIG. 3, the calendar application 302 includes a title bar 308, an all calendars selection 310, a month selection 312 that currently shows "JULY," and a day of the month selection area 314 that includes a representation of each day of the month of July. As such, the user may select data of different granularities for sharing from the calendar application 302 to either of the coupon application 304 and the map application 306. As described above and in more detail below, the data that is shared may be based upon data sharing configurations that are determined in real time as data is selected and identified by the user for user-specified user application data sharing.

It should additionally be noted that, while not limiting, each of the calendar application 302, the coupon application 304, and the map application 306 may execute locally on one or more of the computing device_1 102 through the computing device_N 104. As such, these applications may be considered to be executed by an operating system of a local execution stack of a computing device used by a user.

However, it should be understood that the user-specified user application data sharing may be implemented among multiple devices owned/operated by the user and the data sharing configurations may be implemented to share data between the user's computing devices. Further, as described above, data sharing configurations may be published and shared to allow data sharing that is been established by one user to be implemented by other users between their own applications.

It should additionally be noted that the user-specified user application data sharing described herein may be implemented to protect/limit distribution of user data. As such, while the coupon application 304 may utilize date information received from the calendar application 302 to perform Internet searches for coupons, or the map application 306 may utilize location information received from the calendar application 302 to perform Internet searches for driving directions, the user's other data/information within the calendar application 302 is not exposed and may remain hidden. Accordingly, the present technology allows information sharing among the user's own applications without utilizing web applications to implement data sharing.

FIG. 4 illustrates a first stage of additional processing within the GUI 300 of FIG. 3 for user-specified user application data sharing. As described above, it is assumed that the user is interested in obtaining coupons for use at local restaurants during a lunch break from work on each of July 9 and July 11. To obtain the coupons, the user configures a non-contiguous data drag source 316 that specifies each calendar day (July 9 and July 11) that the user is interested in using as a source of data for user-specified user application data sharing. As described above, there are several possible mechanisms usable by the user to initiate the data sharing process. For purposes of the present example, it may be assumed that the user has utilized either a combination of fingers (e.g., two fingers) on each of the calendar entries for July 9 and July 11, or that the user has utilized a multiple tap action (e.g., a double tap, a triple tap, etc.) on a touchscreen display of the calendar entries for July 9 and July 11 to initiate data sharing. However, as described above, many other possibilities such as menu and interfaces are possible for user interaction within the GUI 300 to implement user-specified user application data sharing, and all such possibilities are considered within the scope of the present subject matter.

In response to receiving an indication initiated by the user from the calendar application 302 that specifies user-selected data sharable by the calendar application 302 (e.g., data associated with the dates July 9 and July 11), the user application data sharing module 218 and/or the CPU 202 configures the non-contiguous data drag source 316 and highlights the calendar entries for July 9 and July 11 in the calendar application 302 (as represented by cross-hatching within the drawing figure, though it is understood that any form of identification as described above may be utilized to represent a data drag source). In response to configuring and highlighting the non-contiguous data drag source 316, the user application data sharing module 218 and/or the CPU 202 determines whether any other local user applications executable by the operating system within the local execution stack share data compatibility with at least a portion of the specified user-selected data.

For purposes of the present example, as described above, the user's interest with respect to July 9 and July 11 is to obtain coupons for local restaurants and the calendar entries for July 9 and July 11 do not include location information because current/default location information may be presumed by other applications absent specific entry of different location information within the calendar data. Based upon this specifically-selected data set of calendar entries, in response to determining that at least one other local user application shares the data compatibility with at least one portion of the specified user-selected data, a data share indication to at least one other local user application may be configured.

Because the present example calendar entries of July 9 and July 11 include calendar information only, a data sharing indication may be configured for the coupon application 304 to cause the coupon application 304 to search for coupons usable by the user on the selected dates of July 9 and July 11. As such, data sharing compatibility has been identified between the calendar application 302 and the coupon application 304 for this specific user data selection.

In response to identifying the data sharing compatibility between these applications, the coupon application 304 is shown to be highlighted to the user within the GUI 300, and the user may drag the non-continuous data drag source 316 by selection of either configured calendar date associated with the non-contiguous configured data drag source 316 to the coupon application 304 to initiate data sharing between applications. It should be noted that highlighting is again illustrated using cross-hatching for purposes of example, though any other form of identification of a compatible application may be utilized as appropriate for a given implementation.

Because the present example calendar entries of July 9 and July 11 do not include location information for data sharing (no location information), a data sharing indication is not generated for the map application 306. As such, the map application 306 is not highlighted within the GUI 300 for the present configured data drag source 316.

Continuing with the present example, it is assumed that the user selects one displayed data element, within the present example the July 11 calendar entry that forms a portion of the non-contiguous data drag source 316 and drags it onto the coupon application 304. The drag operation is represented within FIG. 4 by the arced arrow 318 along which the calendar entries for July 9 and July 11 are moved on to the coupon application 304.

Further, because the coupon application 304 is not currently executing within the present example, execution of the coupon application 304 may be initiated/started by the user application data sharing module 218 and/or the CPU 202 to cause the coupon application 304 to invoke a search for coupons and return those coupons to the user. Again, it is assumed that a default/current location is utilized by the coupon application 304. Additionally, at start up, the coupon application 304 may evaluate a data sharing configuration storage area, such as a data sharing register to determine whether there is an indication to retrieve shared data from a data sharing storage area, such as the data sharing and configuration storage area 216 within the memory 210. The coupon application 304 may perform a search for coupons in the calendar date entries of July 9 and July 11 within the shared data and may return coupon search results to the user (not shown).

FIG. 5 illustrates a second stage of additional processing within the GUI 300 of FIG. 3 and FIG. 4 for user-specified user application data sharing. As described above, it is assumed that the user is interested in obtaining coupons and driving directions for use during a business trip scheduled for the time period between July 19 and July 21. To obtain the coupons and driving directions, the user configures a contiguous data drag source 320 that specifies each calendar day (July 19 through July 21) that the user is interested in using as a source of data for user-specified user application data sharing. As described above, there are several possible mechanisms usable by the user to initiate the data sharing process. For purposes of the present example, it may be assumed that the user has utilized either a combination of fingers (e.g., three fingers) on each of the calendar entries from July 19 to July 21, or that the user has utilized a multiple tap action (e.g., a double tap, a triple tap, etc.) on a touchscreen display of the calendar entries for July 19 and July 21 with the drag operation between the two selected dates to initiate data sharing. However, as described above, many other possibilities such as menu and interfaces are possible for user interaction within the GUI 300 to implement user-specified user application data sharing, and all such possibilities are considered within the scope of the present subject matter.

In response to receiving an indication initiated by the user from the calendar application 302 that specifies user-selected data sharable by the calendar application 302 (e.g., data associated with the dates July 19 and July 21), the user application data sharing module 218 and/or the CPU 202 configures the contiguous data drag source 320 and highlights the calendar entries for July 19 through July 21 in the calendar application 302 (as represented by cross-hatching within the drawing figure, though it is understood that any form of identification as described above may be utilized to represent a data drag source). In response to configuring and highlighting the contiguous data drag source 320, the user application data sharing module 218 and/or the CPU 202 determines whether any other local user applications executable by the operating system within the local execution stack share data compatibility with at least a portion of the specified user-selected data.

For purposes of the present example, as described above, the user's interest with respect to July 19 through July 21 is to obtain coupons and driving directions for use during a business trip, and that the calendar entries for July 19 through July 21 include location information for the business trip. Based upon this specifically-selected data set of calendar entries, in response to determining that at least one other local user application shares the data compatibility with at least one portion of the specified user-selected data, a data share indication to at least one other local user application may be configured.

Because the present example calendar entries of July 19 through July 21 include both calendar information and location information, a data sharing indication may be configured for both the coupon application 304 and the map application 306 to cause the coupon application 304 to search for coupons usable by the user on the business trip and driving directions usable by the user during the selected dates of July 19 through July 21. As such, data sharing compatibility has been identified between the calendar application 302 and the coupon application 304 and has been identified between the calendar application 302 and the map application 306 for this specific user data selection.

In response to identifying the data sharing compatibility between these applications, both the coupon application 304 and the map application 306 are shown to be highlighted to the user within the GUI 300, and the user may drag the contiguous data drag source 320 by selection of any configured calendar date associated with the configured contiguous data drag source 320 to the coupon application 304 and to the map application 306 to initiate data sharing between the respective applications. It should be noted that highlighting is again illustrated using cross-hatching for purposes of example, though any other form of identification of a compatible application may be utilized as appropriate for a given implementation.

Continuing with the present example, it is assumed that the user selects one displayed data element, within the present example the July 20 calendar entry that forms a portion of the contiguous data drag source 320 and drags it onto the coupon application 304. This drag operation is represented within FIG. 5 by the arced arrow 322 along which the calendar entries for July 19 through July 21 are moved on to the coupon application 304.

Additionally, it is assumed that the user selects one displayed data element, again within the present example the July 20 calendar entry that forms a portion of the contiguous data drag source 320, and drags it onto the map application 306. This drag operation is represented within FIG. 5 by the arced arrow 324 along which the calendar entries for July 19 through July 21 are moved on to the map application 306.

Further, because the coupon application 304 and the map application 306 are currently not executing, execution of the coupon application 304 and the map application 306 may be initiated by the user application data sharing module 218 and/or the CPU 202 to cause the coupon application 304 to invoke a search for coupons at the location of the business trip using the location information associated with the respective calendar entries and return those coupons to the user. Additionally, the map application 306 may be invoked to perform a search for driving directions for use during the business trip. Additionally, at start up or at any other time(s), each of the coupon application 304 and the map application 306 may evaluate an individual or shared data sharing configuration storage area, such as data sharing register(s), to determine whether there is an indication to retrieve shared data from a data sharing storage area, such as the data sharing and configuration storage area 216 within the memory 210. The coupon application 304 may perform a search for coupons for use during the business trip for the calendar date entries of July 19 through July 21 within the shared data and may return coupon search results to the user (not shown). The map application 306 may perform a search for driving directions for use during the business trip for the calendar date entries of July 19 through July 21 within the shared data and may return driving direction search results to the user (not shown). It is assumed that the map application 306 may access current location information, such as from a configuration register or otherwise, to use as a starting point for the driving directions.

As such, the examples within FIG. 3 through FIG. 5 illustrate one possible implementation of user selection of data in one application to form noncontiguous or contiguous data drag sources usable for sharing user-specified data between user applications. As another example, other interfaces such as a textual list of application targets may be supported such that multiple targets may be selected within the textual list. It should be noted that many other possibilities for implementation of the user-specified user application data sharing are possible and all are considered within the scope of the present subject matter.

Figure 6:
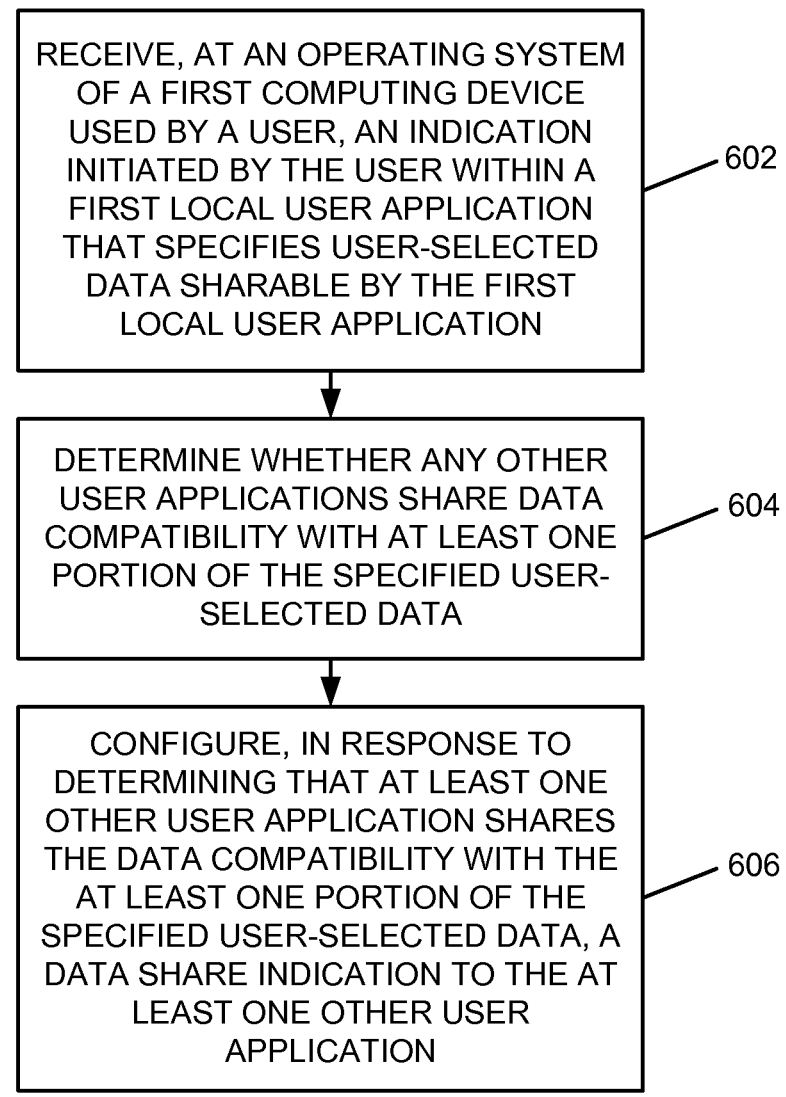
FIG. 6 is a flow chart of an example of an implementation of a process for user-specified user application data sharing according to an embodiment of the present subject matter.
Figure 7A:
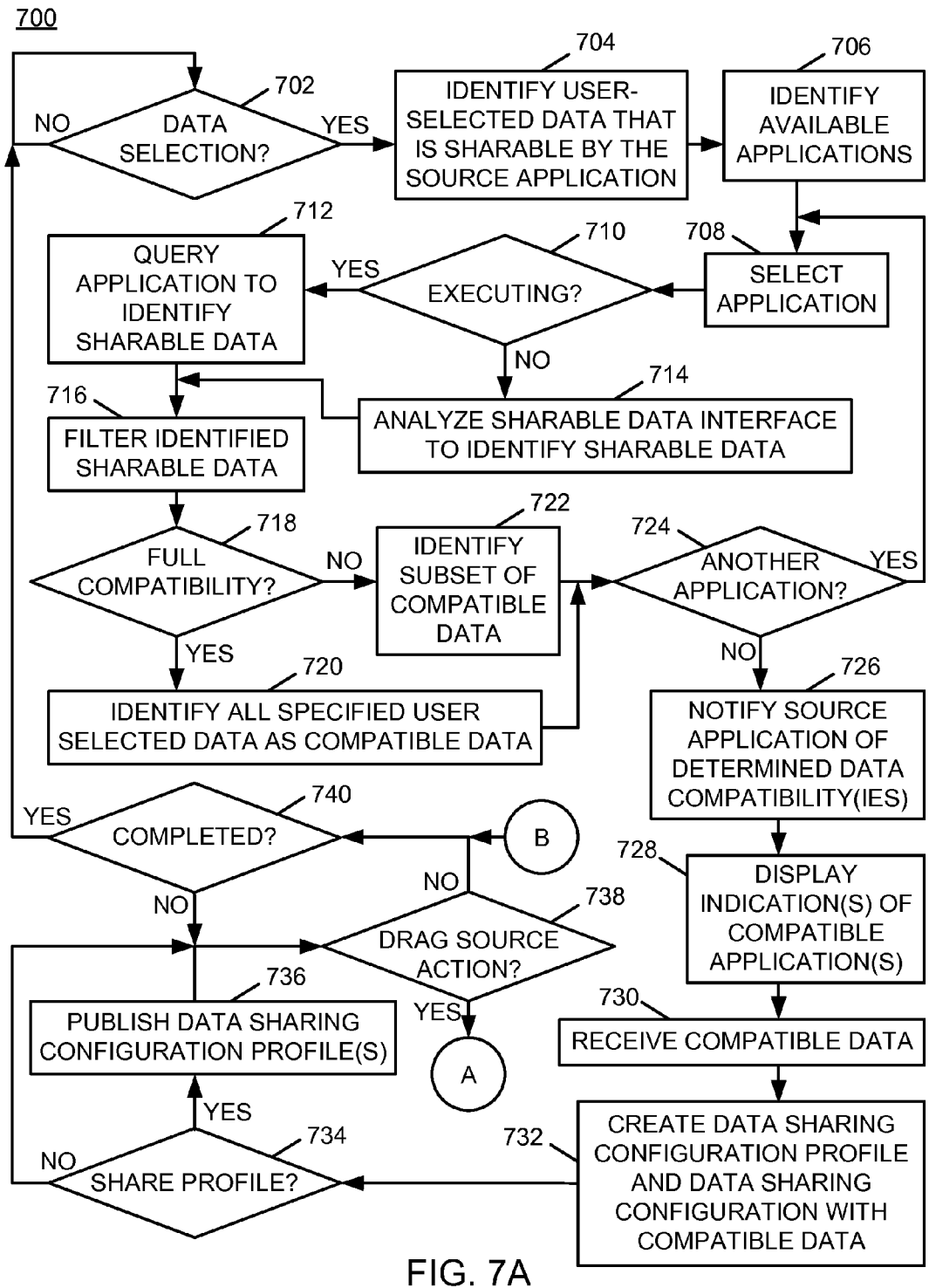
FIG. 7A is a flow chart of an example of an implementation of initial processing within a process for user-specified user application data sharing according to an embodiment of the present subject matter.
Figure 7B:
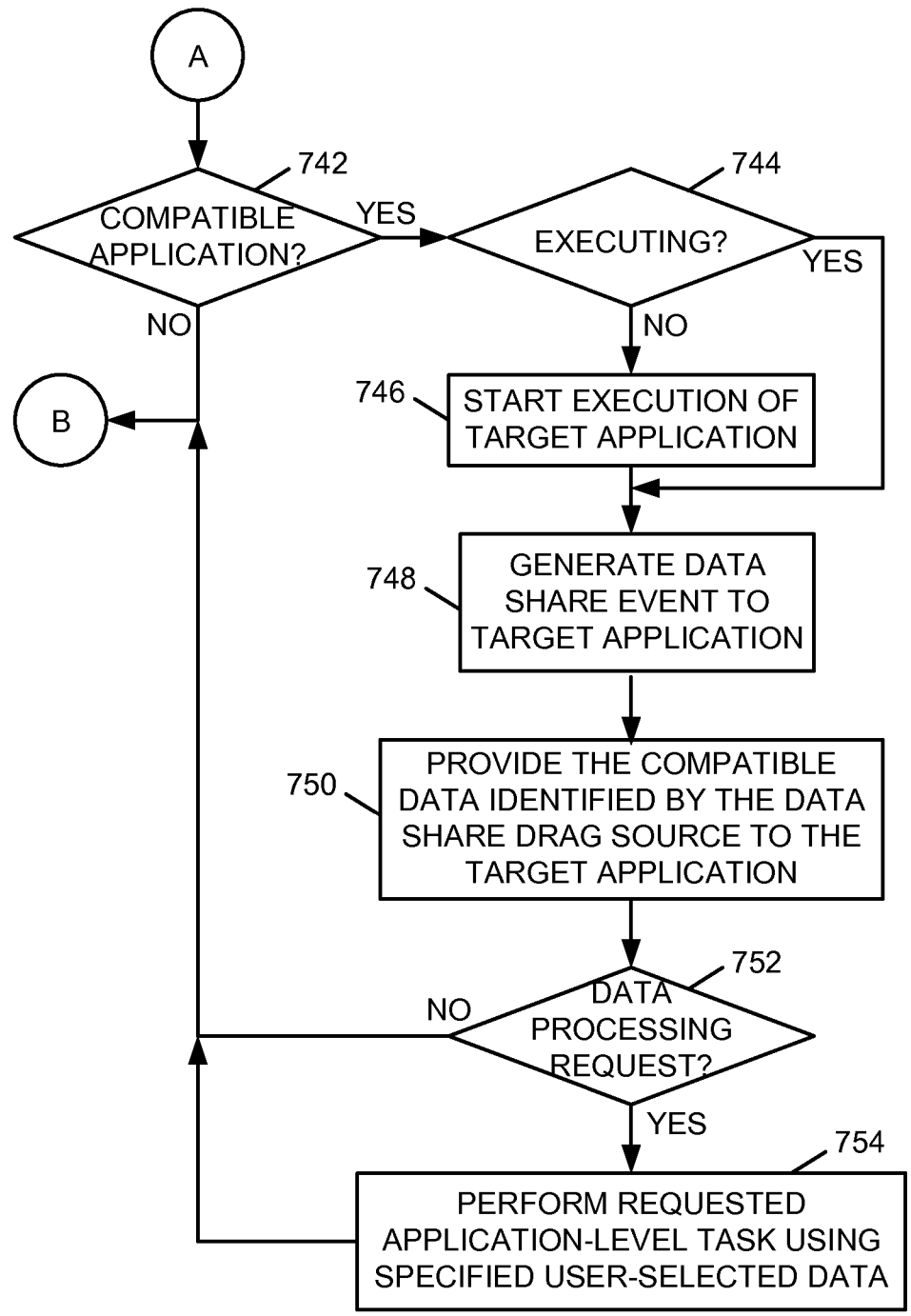
FIG. 7B is a flow chart of an example of an implementation of additional processing within a process for user-specified user application data sharing according to an embodiment of the present subject matter.

FIG. 6 through FIG. 7B described below represent example processes that may be executed by devices, such as the core processing module 200, to perform the user-specified user application data sharing associated with the present subject matter. Many other variations on the example processes are possible and all are considered within the scope of the present subject matter. The example processes may be performed by modules, such as the user application data sharing module 218 and/or executed by the CPU 202, such as in association with execution of one or more operating systems, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 600 for user-specified user application data sharing. At block 602, the process 600 receives, at an operating system of a first computing device used by a user, an indication initiated by the user within a first local user application that specifies user-selected data sharable by the first local user application. At block 604, the process 600 determines whether any other user applications share data compatibility with at least one portion of the specified user-selected data. At block 606, the process 600 configures, in response to determining that at least one other user application shares the data compatibility with the at least one portion of the specified user-selected data, a data share indication to the at least one other user application.

FIGS. 7A-7B illustrate a flow chart of an example of an implementation of a process 700 for user-specified user application data sharing. FIG. 7A illustrates initial processing within the process 700. At decision point 702, the process 700 makes a determination as to whether a data selection within the local user application has been detected. For example, an indication initiated by a user from a local user application may be received at an operating system of a computing device used by a user that specifies user-selected data that is sharable by the local user application.

The local user application from which the indication is received may be considered a data source application.

At block 704, the process 700 identifies the user-selected data that is shareable by the source application. The identification of the user-selected data may be performed by evaluation of the detected request to share the data or by analysis of a shareable data interface. At block 706, the process 700 identifies available applications with which to potentially share data. The available applications may be local user applications executed by the same computing device as the source data application, or may be remote user applications that are executed by one or more of the user's other computing devices.

The process 700 begins processing to determine whether any other user applications executable by the operating system (or executable on a remote device of the same user) share data compatibility with the specified user-selected shareable data. At block 708, the process 700 selects an application from the identified available applications. At decision point 710, the process 700 makes a determination as to whether the selected application is currently executing.

In response to determining that the selected application is currently executing, the process 700 queries the other user application to identify sharable data of the other user application at block 712. For purposes of the present example it is assumed that a response is received from the target application that specifies data that is sharable by the other user application. Alternatively, in response to determining that the selected application is not currently executing at decision point 710, the process 700 analyzes a sharable data interface (e.g., stored application metadata) associated with the other user application to identify the sharable data associated with that application at block 714.

It should be noted that the present example makes the distinction between executing and non-executing applications to illustrate application query processing. However, it should be understood that rather than querying the executing application, the process 700 may alternatively query/analyze the sharable data interface (e.g., the stored application metadata) associated with the other user application to identify the sharable data associated with that application to determine what data that application supports for data sharing, which may reduce inter-application messaging load.

In response to querying the other user application at block 712, or in response to analyzing the shareable data interface at block 714, the process 700 filters the identified sharable data of the other user application using the specified user-selected data at block 716. At decision point 718, the process 700 makes a determination as to whether full compatibility exists between the two data sets. In response to determining that full compatibility exists between the two data sets, the process 700 identifies all user-specified user-selected data as compatible data between the two applications at block 720. In response to determining that full compatibility does not exist between the two data sets, the process 700 identifies the subset of compatible data within the specified user-selected data at block 722.

In response to either identifying all of the user-specified user-selected data as compatible data between the two applications at block 720, or in response to identifying the subset of compatible data within the specified user-selected data at block 722, the process 700 makes a determination as to whether another application is available to evaluate for data compatibility at decision point 724. As described above, the process 700 may determine whether any other local applications executable by the same computing device or remote user applications executable by another/second computing device used by the user share data compatibility with the specified user-selected data. In response to determining that another application is available to evaluate for data compatibility, the process 700 returns to block 708 and iterates as described above identify all data compatibilities for the user-specified user-selected data of the source data application.

Returning to the description of decision point 724, in response to determining that all applications have been processed and evaluated for data compatibility, the process 700 notifies the data source application of the determined data compatibility(ies) at block 726. The notification to the data source application may include identifying the compatible data within a user interface (UI) as a data share drag source, as described in detail above.

At block 728, the process 700 displays an indication of at least one other user application determined to share data compatibility with the specified user-selected data. For example, the process 700 may highlight an icon or other indicator associated with the other application that is determined to share data compatibility. At block 730, the process 700 receives the compatible data. At block 732, the process 700 creates a data sharing configuration profile and creates a data sharing configuration that includes the specified user-selected data that is compatible with the other application.

The data sharing configuration profile may include data identifiers that document the compatible data elements without inclusion of the user's actual data. As described in more detail below, the data sharing configuration profile may be shared with other users to allow those users to share their own data among their own applications. It should further be noted that a data sharing configuration profile may be created for each determined data compatibility between each pair of compatible applications.

The data sharing configuration may include all of the data or an identified subset of the data specified by the user for sharing with other user applications. The data sharing configuration profile and the data sharing configuration may each be created, for example, within the data sharing and configuration storage area 216 of the memory 210. It should further be noted that a data sharing configuration profile and data sharing configuration may be created for each determined data compatibility between each pair of compatible applications.

Additionally, as described above, a data sharing configuration may be configured and utilized to establish a data sharing authorization for either a single data sharing event or for ongoing data sharing activities, such as for example, in response to changes of data that is configured to be shared between applications. As such, the data sharing configuration may be utilized to establish authorization for future data sharing activities. For example, and returning to the calendar application and coupon application data sharing example described above, a user may configure a data sharing configuration to share calendar information with the coupon application. The coupon application may, in an ongoing manner (e.g., periodically, at scheduled times, or otherwise), determine what trips a user plans using the shared calendar data. If the user adds a trip, the coupon application may be notified (e.g., an interrupt on data change) to obtain calendar and location data for the additional trip to provide coupons for that trip. Accordingly, the present technology allows configuration of future data share events between applications in addition to individual data sharing events. Many other possibilities for granularity of data sharing in quantum and time are possible and all are considered within the scope of the present subject matter.

At decision point 734, the process 700 makes a determination as to whether to share any created data sharing configuration profile(s), such as via a social networking server or otherwise, to allow other users to utilize the data sharing configuration profile(s) to share their own data among their own user applications. In response to determining to share the data sharing configuration profile(s), the process 700 publishes one or more of the created data sharing configuration profiles at block 736.

In response to publishing the created data sharing configuration profile at block 736, or in response to determining not to share the created data sharing configuration profile at decision point 734, the process 700 makes a determination at decision point 738 as to whether a drag source action associated with the displayed indication(s) of compatible data has been detected. For example, the process 700 may detect, via a touchscreen display, an indication that the user has dragged an item of the user-selected data specified as the data share drag source from the first user application.

In response to determining that a drag source action associated with the displayed indication(s) of compatible data has not been detected, the process 700 makes a determination at decision point 740 as to whether processing associated with the user-specified data share request is completed. In response to determining that processing associated with the user-specified data share request is not completed, the process 700 returns to decision point 738 and iterates as described above. In response to determining that processing associated with the user-specified data share request is completed, the process 700 returns to decision point 702 and iterates as described above.

Returning to the description of decision point 738, in response to determining that a drag source action associated with the displayed indication(s) of compatible data has been detected, the process 700 transitions to the processing shown and described in association with FIG. 7B.

FIG. 7B illustrates additional processing associated with the process 700 for user-specified user application data sharing. At decision point 742, the process 700 makes a determination as to whether the drag source action indicates that the user has dragged the data drag source to a displayed aspect of another user application (a target data sharing application) indicated to share the data compatibility with the specified user-selected data. For example, the displayed aspect of the other user application may include an icon, a dialog box, or any other displayed aspect of the other application.

In response to determining that the drag source action indicates that the user has not dragged the data drag source to a displayed aspect of another user application indicated to share the data compatibility with the specified user-selected data at decision point 742, the process 700 returns to the processing described in association with FIG. 7A at decision point 740 and iterates as described above. In response to determining that the drag source action indicates that the user has dragged the data drag source to a displayed aspect of another user application indicated to share the data compatibility with the specified user-selected data at decision point 742, the process 700 makes a determination at decision point 744 as to whether the target data sharing application is currently executing. In response to determining that the target data sharing application is not currently executing, the process 700 starts execution of the target data sharing application at block 746.

In response to starting execution of the target data sharing application at block 746, or in response to determining at decision point 744 that the target data sharing application is currently executing, the process 700 generates a data share event/indication to the target data sharing application at block 748. The process 700 provides the compatible data identified by the data share drag source to the target data sharing application at block 750. Where the target data sharing application is a local application, the data share event/indication may result in the target data sharing application retrieving the compatible data from the data sharing and configuration storage area 216 of the memory 210. Alternatively, where the target data sharing application is a remote application that is executing on another device used by the user, the process 700 may send the created data sharing configuration that includes the compatible data to the remote user application.

At decision point 752, the process 700 makes a determination as to whether a data processing request from the target data sharing application has been detected/received. A data processing request from the target data sharing application may include a request to perform an application-level task using the specified user-selected data that has been shared with the application. As one example from the examples provided above, the data source application may include a calendar application and the target data sharing application may include a coupon application, and the coupon application may request coupons associated with a particular date and/or location.

In response to determining that a data processing request from the target data sharing application has been detected/received at decision point 752, the process 700 performs the requested application-level task using the specified user-selected data that was shared with the respective target data sharing application at block 754. As with other portions of the present example, it should be understood that there is no specific action required of the respective target data sharing application in response to a data sharing event. As such, a data processing request from a target data sharing application is described within the present example to show that the shared data may be used by the target data sharing application to initiate requests.

In response to performing the requested application-level task using the specified user-selected data that was shared with the respective target data sharing application at block 754, or in response to determining that a data processing request from the target data sharing application has not been detected/received at decision point 752, the process 700 returns to processing described in association with FIG. 7A at decision point 740 and iterates as described above, until processing is completed and the process returns to decision point 702.

As such, the process 700 response to user data selections associated with data source applications and identifies compatible data with one or more target data sharing applications of the user. The process 700 notifies the source application, retrieves any determined compatible data for each target data sharing application, and configures a data sharing configuration with the respective sets of compatible data. The process 700 may also share a created data sharing configuration profile, such as to a social networking server, to allow the user to share created data sharing configuration profiles. The process 700 further responds to data drag source actions to provide compatible data to target data sharing applications or to trigger the target data sharing applications to retrieve the created data sharing configuration. The process 700 may additionally perform requested application-level tasks using the shared data.

As described above in association with FIG. 1 through FIG. 7B, the example systems and processes provide user-specified user application data sharing. Many other variations and additional activities associated with user-specified user application data sharing are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   by an operating system of a first computing device used by a user:
      receiving an indication initiated by the user within a first local user application that specifies existing user-selected configured sharable data configured as part of a data set within the first local user application as sharable by the first local user application with different user applications, where the different user applications perform different application-level tasks that identify new information of relevance to the user according to data content of the configured sharable data;
      determining whether any other different user applications share data compatibility with at least one portion of the configured sharable data, where the determining comprises:
         identifying data configured as sharable within each of a plurality of other different user applications executable by the operating system that is compatible with the configured sharable data;
         filtering the identified data configured as sharable of each of the plurality of other different user applications using the configured sharable data; and
         identifying a first subset of compatible data within the configured sharable data as the at least one portion of the configured sharable data;
   the method further comprising:
      configuring, in response to determining that at least one other different user application shares the data compatibility with the at least one portion of the configured sharable data, a data share indication to the at least one other different user application that causes the at least one other different user application to perform a requested application-level task using the configured sharable data; and
      obtaining at least one new item of information on behalf of the user from the at least one other different user application in response to the requested application-level task performed using the configured sharable data.

2. The method of claim 1, where determining whether any other different user applications share the data compatibility with the at least one portion of the configured sharable data comprises:
   determining whether any other different user applications executable by the operating system of the first computing device used by the user share the data compatibility with the at least one portion of the configured sharable data; and
   determining whether any other different remote user applications executable by an operating system of at least one other computing device used by the user share the data compatibility with the at least one portion of the configured sharable data.

3. The method of claim 1, where identifying the data configured as sharable within each of the plurality of other different user applications executable by the operating system that is compatible with the configured sharable data comprises one of:
   querying each of the plurality of other different user applications to identify the data configured as sharable within the respective other different user application; and
   analyzing a configured sharable data interface associated with each of the plurality of other different user applications to identify the data configured as sharable within the respective other different user application.

4. The method of claim 1, where:
   configuring, in response to determining that the at least one other different user application shares the data compatibility with the at least one portion of the configured sharable data, the data share indication to the at least one other different user application that causes the at least one other different user application to perform the requested application-level task using the configured sharable data comprises one of:
      creating a data sharing configuration comprising compatible data from the first local user application, where the data sharing configuration authorizes at least one data sharing event with the at least one other different user application; and creating a data sharing configuration profile; and further comprising publishing the created one of the data sharing configuration and the data sharing configuration profile to a social networking server.

5. A method, comprising:

by an operating system of a first computing device used by a user:

receiving an indication initiated by the user within a first local user application that specifies existing user-selected configured sharable data configured as part of a data set within the first local user application as sharable by the first local user application with different user applications, where the different user applications perform different application-level tasks that identify new information of relevance to the user according to data content of the configured sharable data;

determining whether any other different user applications share data compatibility with at least one portion of the configured sharable data;

configuring, in response to determining that the at least one other different user application shares the data compatibility with the at least one portion of the configured sharable data, a data share indication to the at least one other different user application that causes the at least one other different user application to perform a requested application-level task using the configured sharable data, where the configuring of the data share indication comprises:

determining whether the at least one other different user application is currently executing;

starting execution of each of the at least one other different user application in response to determining that the at least one other different user application is not currently executing; and providing the configured sharable data to each of the at least one other different user application;

the method further comprising:

obtaining at least one new item of information on behalf of the user from the at least one other different user application in response to the requested application-level task performed using the configured sharable data.

6. The method of claim 1, further comprising, by the operating system of the first computing device used by the user:

creating a data sharing configuration comprising the at least one portion of the configured sharable data that is compatible with the at least one other different user application;

notifying the first local user application of the determined data compatibility, where the first local user application identifies the first subset of compatible data of the configured sharable data within a user interface (UI) as a data share drag source;

detecting an indication that the user has dragged an item of the configured sharable data identified as the data share drag source from the first local user application;

determining whether the user has dragged the data share drag source to a displayed aspect of the at least one other different user application indicated to share the data compatibility with the configured sharable data;

generating a data share event to the at least one other different user application; and providing the first subset of compatible data of the configured sharable data identified as the data share drag source to the at least one other different user application.

7. The method of claim 1, further comprising, by the operating system of the first computing device used by the user:

receiving a data processing request from the at least one other different user application to perform the application-level task using the configured sharable data; and performing the requested application-level task using the configured sharable data.

8. A computer program product, comprising:

a computer readable storage medium having computer readable program code embodied therewith, where the computer readable program code when executed on a computer causes the computer to, by an operating system of the computer as a first computing device used by a user:

receive an indication initiated by the user within a first local user application that specifies existing user-selected configured sharable data configured as part of a data set within the first local user application as sharable by the first local user application with different user applications, where the different user applications perform different application-level tasks that identify new information of relevance to the user according to data content of the configured sharable data;

determine whether any other different user applications share data compatibility with at least one portion of the configured sharable data, where in causing the computer to determine, the computer readable program code when executed on the computer causes the computer to:

identify data configured as sharable within each of a plurality of other different user applications executable by the operating system that is compatible with the configured sharable data;

filter the identified data configured as sharable of each of the plurality of other different user applications using the configured sharable data; and identify a first subset of compatible data within the configured sharable data as the at least one portion of the configured sharable data;

where the computer readable program code when executed on the computer further causes the computer to:

configure, in response to determining that at least one other different user application shares the data compatibility with the at least one portion of the configured sharable data, a data share indication to the at least one other different user application that causes the at least one other different user application to perform a requested application-level task using the configured sharable data; and obtain at least one new item of information on behalf of the user from the at least one other different user application in response to the requested application-level task performed using the configured sharable data.

9. The computer program product of claim 8, where, in causing the computer to determine whether any other different user applications share the data compatibility with the at least one portion of the configured sharable data, the computer readable program code when executed on the computer causes the computer to:

determine whether any other different user applications executable by the operating system of the first computing device used by the user share the data compatibility with the at least one portion of the configured sharable data; and determine whether any other different remote user applications executable by an operating system of at least one other computing device used by the user share the data compatibility with the at least one portion of the configured sharable data.

10. The computer program product of claim 8, where, in causing the computer to identify the data configured as sharable within each of the plurality of other different user applications executable by the operating system that is compatible with the configured sharable data, the computer readable program code when executed on the computer causes the computer to one of:

query each of the plurality of other different user applications to identify the data configured as sharable within the respective other different user application; and analyze a configured sharable data interface associated with each of the plurality of other different user applications to identify the data configured as sharable within the respective other different user application.

11. The computer program product of claim 8, where:

in causing the computer to configure, in response to determining that the at least one other different user application shares the data compatibility with the at least one portion of the configured sharable data, the data share indication to the at least one other different user application that causes the at least one other different user application to perform the requested application-level task using the configured sharable data, the computer readable program code when executed on the computer causes the computer to one of:

create a data sharing configuration comprising compatible data from the first local user application, where the data sharing configuration authorizes at least one data sharing event with the at least one other different user application; and create a data sharing configuration profile; and the computer readable program code when executed on the computer further causes the computer to publish the created one of the data sharing configuration and the data sharing configuration profile to a social networking server.

12. A computer program product, comprising:

a computer readable storage medium having computer readable program code embodied therewith, where the computer readable program code when executed on a computer causes the computer to, by an operating system of the computer as a first computing device used by a user:

receive an indication initiated by the user within a first local user application that specifies existing user-selected configured sharable data configured as part of a data set within the first local user application as sharable by the first local user application with different user applications, where the different user applications perform different application-level tasks that identify new information of relevance to the user according to data content of the configured sharable data;

determine whether any other different user applications share data compatibility with at least one portion of the configured sharable data;

configure, in response to determining that the at least one other different user application shares the data compatibility with the at least one portion of the configured sharable data, a data share indication to the at least one other different user application that causes the at least one other different user application to perform a requested application-level task using the configured sharable data, where, in causing the computer to configure the data share indication, the computer readable program code when executed on the computer causes the computer to:

determine whether the at least one other different user application is currently executing;

start execution of each of the at least one other different user application in response to determining that the at least one other different user application is not currently executing; and provide the configured sharable data to each of the at least one other different user application;

where the computer readable program code when executed on the computer further causes the computer to:

obtain at least one new item of information on behalf of the user from the at least one other different user application in response to the requested application-level task performed using the configured sharable data.

13. The computer program product of claim 8, where the computer readable program code when executed on the computer further causes the computer to:

create a data sharing configuration comprising the at least one portion of the configured sharable data that is compatible with the at least one other different user application;

notify the first local user application of the determined data compatibility, where the first local user application identifies the first subset of compatible data of the configured sharable data within a user interface (UI) as a data share drag source;

detect an indication that the user has dragged an item of the configured sharable data identified as the data share drag source from the first local user application;

determine whether the user has dragged the data share drag source to a displayed aspect of the at least one other different user application indicated to share the data compatibility with the configured sharable data;

generate a data share event to the at least one other different user application; and provide the first subset of compatible data of the configured sharable data identified as the data share drag source to the at least one other different user application.

14. The computer program product of claim 8, where the computer readable program code when executed on the computer further causes the computer to:

receive a data processing request from the at least one other different user application to perform the application-level task using the configured sharable data; and perform the requested application-level task using the configured sharable data.

15. The computer program product of claim 8, where the computer program product is in the form of a computer system, with the computer program product further comprising:

a processor(s) set structured, programmed, and/or connected to execute the computer readable program code stored in the computer readable storage medium.

16. The computer program product of claim 9, where the computer program product is in the form of a computer system, with the computer program product further comprising:
   a processor(s) set structured, programmed, and/or connected to execute the computer readable program code stored in the computer readable storage medium.

17. The computer program product of claim 10, where the computer program product is in the form of a computer system, with the computer program product further comprising:
   a processor(s) set structured, programmed, and/or connected to execute the computer readable program code stored in the computer readable storage medium.

18. The computer program product of claim 11, where the computer program product is in the form of a computer system, with the computer program product further comprising:
   a processor(s) set structured, programmed, and/or connected to execute the computer readable program code stored in the computer readable storage medium.

19. The computer program product of claim 12, where the computer program product is in the form of a computer system, with the computer program product further comprising:
   a processor(s) set structured, programmed, and/or connected to execute the computer readable program code stored in the computer readable storage medium.

20. The computer program product of claim 13, where the computer program product is in the form of a computer system, with the computer program product further comprising:
   a processor(s) set structured, programmed, and/or connected to execute the computer readable program code stored in the computer readable storage medium.

21. The computer program product of claim 14, where the computer program product is in the form of a computer system, with the computer program product further comprising:
   a processor(s) set structured, programmed, and/or connected to execute the computer readable program code stored in the computer readable storage medium.

* * * * *